Feb. 23, 1926.  
W. LINDNER  
FILLER  
Filed April 1, 1924  
1,574,584

Patented Feb. 23, 1926.

1,574,584

UNITED STATES PATENT OFFICE.

WILHELM LINDNER, OF DRESDEN, GERMANY.

FILLER.

Application filed April 1, 1924. Serial No. 703,569.

*To all whom it may concern:*

Be it known that I, WILHELM LINDNER, engineer, a citizen of the German Republic, residing at Kaitzerstrasse 16, Dresden, Germany, have invented certain new and useful Improvements in Fillers, of which the following is a specification.

The present invention relates to a refractory filler element of the type adapted to be promiscuously thrown into heat accumulators. This filler may be employed with exceptional advantage in metallurgical works in operating the Cowper apparatus and Siemens regenerative gas furnace.

The superior features of the invention are obtained by imparting to the filler a certain definite form so as to offer the largest possible surface to passing gases. The form of the individual fillers comprises a substantially cylindrical body, the cross section of which resembles a figure 8. This brick may also be provided with holes passing through the entire depth of it or its surface may be chequered. The brick fillers thus obtained are then simply thrown into the Cowper apparatus or any other heat accumulator without the least regard for their arrangement within the apparatus.

I am aware that prior to my invention fillers for Cowper apparatus and the other kinds of heat accumulated mentioned above have been known; these fillers, however, required careful building up within the apparatus.

The drawings illustrate two modifications of such bricks which consist either of ceramic sinter mass or acidproof metals, according to requirements.

Figure 1:
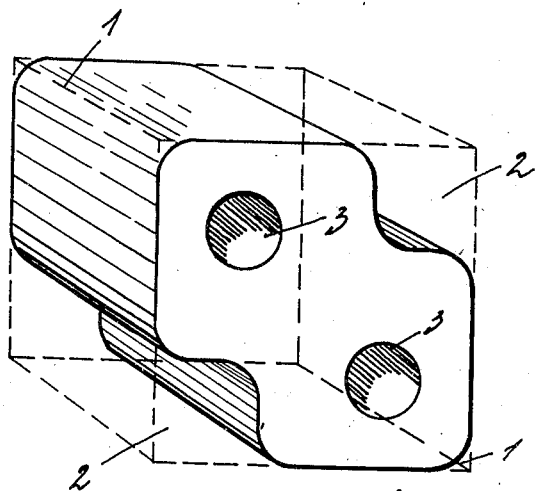
Fig. 1 is a perspective view of my preferred form of brick.
Figure 2:
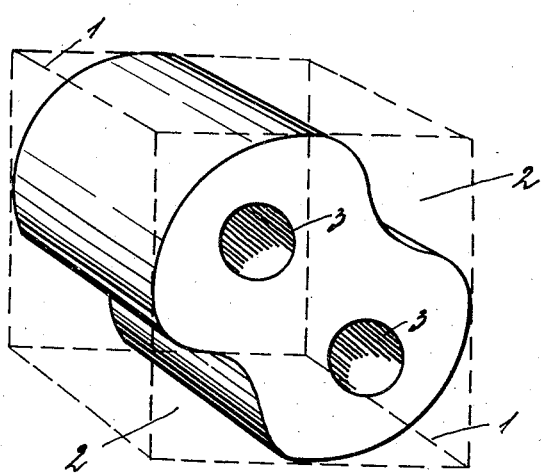
Fig. 2 is a perspective view of a modified form of brick.

As the illustrations show, the basic form of the brick is a substantially cylindrical body. The two opposite edges 1 are buffed, while the two other edges 2 are cut in an inward direction. The brick has now the form of an 8. Eventually drills 3 may be provided to run through the bricks. The bricks thus obtained are thrown irregularly into the apparatus.

I claim:—

A refractory filler element of the type adapted to be promiscuously thrown into heat accumulators, consisting of a substantially cylindrical body, the cross section of which resembles a figure 8.

In testimony whereof I have affixed my signature.

WILHELM LINDNER.